(12) United States Patent
Pentek et al.

(10) Patent No.: US 8,189,292 B2
(45) Date of Patent: May 29, 2012

(54) METHOD FOR MANUFACTURING A MAGNETIC WRITE HEAD HAVING A WRITE POLE WITH A TRAILING EDGE TAPER USING A RIEABLE HARD MASK

(75) Inventors: Aron Pentek, San Jose, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 739 days.

(21) Appl. No.: 12/343,723

(22) Filed: Dec. 24, 2008

(65) Prior Publication Data

US 2010/0155363 A1  Jun. 24, 2010

(51) Int. Cl.
  *G11B 5/127* (2006.01)
(52) U.S. Cl. ............... 360/110; 360/125.01; 360/313; 360/319
(58) Field of Classification Search .................. None
  See application file for complete search history.

(56) References Cited

U.S. PATENT DOCUMENTS

| | | | | |
|---|---|---|---|---|
| 5,599,749 A | | 2/1997 | Hattori | 216/11 |
| 6,300,202 B1 | | 10/2001 | Hobbs et al. | 438/287 |
| 6,762,909 B2 | * | 7/2004 | Albrecht et al. | 360/97.02 |
| 6,920,016 B2 | * | 7/2005 | Yamakura et al. | 360/235.7 |
| 7,081,041 B1 | * | 7/2006 | Guthrie et al. | 451/28 |
| 2003/0034497 A1 | | 2/2003 | Yamazaki et al. | 257/86 |
| 2004/0082176 A1 | | 4/2004 | Kane et al. | 438/690 |
| 2004/0205958 A1 | | 10/2004 | Grynkewich et al. | 29/603.14 |
| 2004/0228033 A1 | | 11/2004 | Aoki et al. | 360/125.13 |
| 2005/0007217 A1 | | 1/2005 | Deligianni et al. | 335/78 |
| 2005/0023693 A1 | | 2/2005 | Fitzsimmons et al. | 257/758 |
| 2005/0044699 A1 | | 3/2005 | Khera et al. | 29/603.12 |
| 2005/0219744 A1 | | 10/2005 | Feldbaum et al. | 360/125.13 |
| 2005/0219747 A1 | | 10/2005 | Hsu et al. | 360/125.3 |
| 2005/0245087 A1 | | 11/2005 | Sasagawa et al. | 438/706 |
| 2005/0277299 A1 | | 12/2005 | Le et al. | 438/694 |
| 2006/0002024 A1 | | 1/2006 | Le et al. | 360/125.64 |
| 2006/0023352 A1 | | 2/2006 | Le et al. | 360/125.03 |
| 2006/0044677 A1 | | 3/2006 | Li et al. | 360/122 |
| 2006/0174474 A1 | | 8/2006 | Le | 29/603.12 |
| 2006/0275997 A1 | | 12/2006 | Ikeda | 438/396 |
| 2007/0006455 A1 | | 1/2007 | Belov | 29/847 |
| 2007/0020934 A1 | | 1/2007 | Gaidis et al. | 438/689 |
| 2007/0042603 A1 | | 2/2007 | Kropewnicki et al. | 438/689 |
| 2007/0211384 A1 | * | 9/2007 | Hsiao et al. | 360/126 |
| 2008/0100959 A1 | * | 5/2008 | Feldbaum et al. | 360/110 |
| 2008/0112079 A1 | | 5/2008 | Fullerton et al. | 360/123.02 |

* cited by examiner

*Primary Examiner* — Duy Deo
(74) *Attorney, Agent, or Firm* — Zilka-Kotab, PC

(57) ABSTRACT

A method for manufacturing a magnetic write head having a write pole with a tapered, stepped trailing edge. The method includes depositing a magnetic write pole material over a substrate, and then forming a magnetic step structure over the magnetic write pole material. A mask structure is then formed, which includes a multilayer hard mask formed over the magnetic write pole material and the magnetic step structure. An ion milling process is then performed to remove a portion of the write pole material to define a write pole. A non-magnetic material can be deposited and ion milling performed to form non-magnetic side gap layer at the sides of the write pole. A multi-step reactive ion milling process can then be performed to remove the remaining hard mask from over the write pole.

20 Claims, 16 Drawing Sheets

METHOD FOR MANUFACTURING A MAGNETIC WRITE HEAD HAVING A WRITE POLE WITH A TRAILING EDGE TAPER USING A RIEABLE HARD MASK

FIELD OF THE INVENTION

The present invention relates to perpendicular magnetic recording and more particularly to a magnetic the use of a RIEable hard mask to form a write pole with a trailing edge taper.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head having a write pole with a tapered, stepped trailing edge. The method includes depositing a magnetic write pole material over a substrate, and then forming a magnetic step structure over the magnetic write pole material. A mask structure is then formed, which includes a multilayer hard mask formed over the magnetic write pole material and the magnetic step structure. An ion milling process is then performed to remove a portion of the write pole material to define a write pole. A non-magnetic material can be deposited and ion milling performed to form non-magnetic side gap layer at the sides of the write pole. A multi-step reactive ion milling process can then be performed to remove the remaining hard mask from over the write pole.

The hard mask structure can be a multi-layer hard mask that has an end point detection layer that facilitates removal of the hard mask without damaging the write pole. Furthermore, the hard mask can be advantageously constructed of RIEable materials to facilitate removal after the magnetic step, and non-magnetic side gap layers have been formed.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
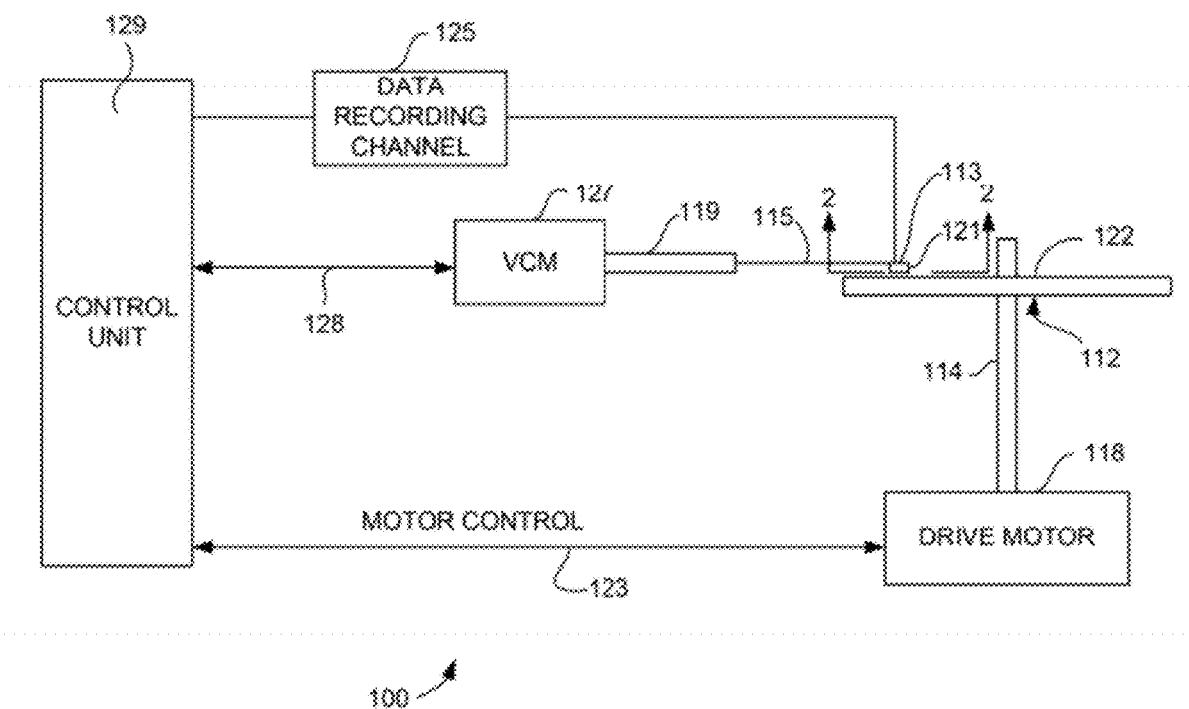
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
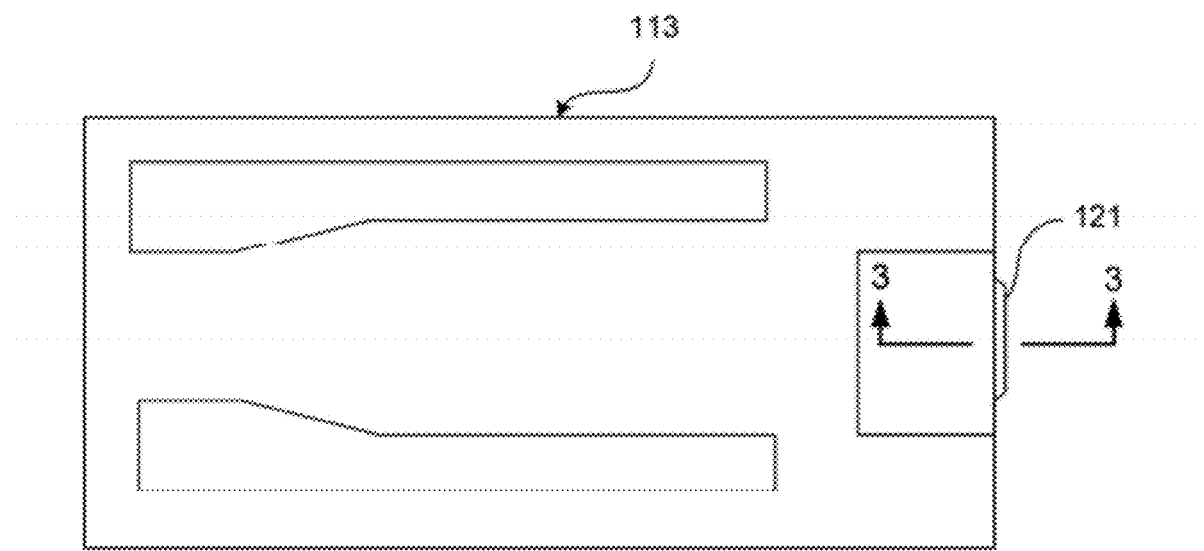
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
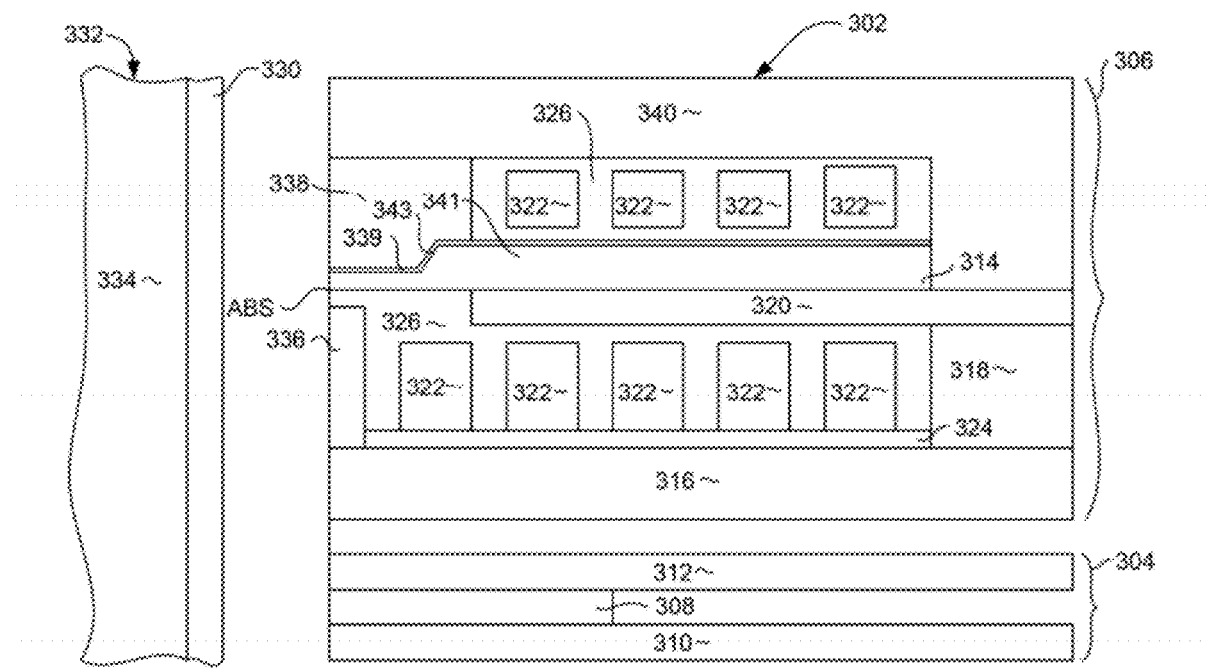
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339. The shield 338 also has side shielding portions that are separated from sides of the write pole by non-magnetic side gap layers (not shown). The trailing shield 338 attracts the magnetic field from the write pole 314, which slightly cams the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

In order to increase data density in a magnetic data recording system, the bit length of the recorded data bits must be decreased. This requires a reduction of the write pole thickness as measured from the trailing edge to the leading edge of the write pole 314. However, this reduction in write pole thickness risks magnetically saturating the write pole so that magnetic flux to the tip of the write pole 314 can become choked off, thereby reducing write field strength. In order to mitigate this, the write pole 314 has a tapered, stepped trailing edge, which helps to funnel magnetic flux to the tip of the write pole 314, thereby avoiding saturation of the write pole 314. This maximizes write field strength at very small bit sizes.

Figure 4:
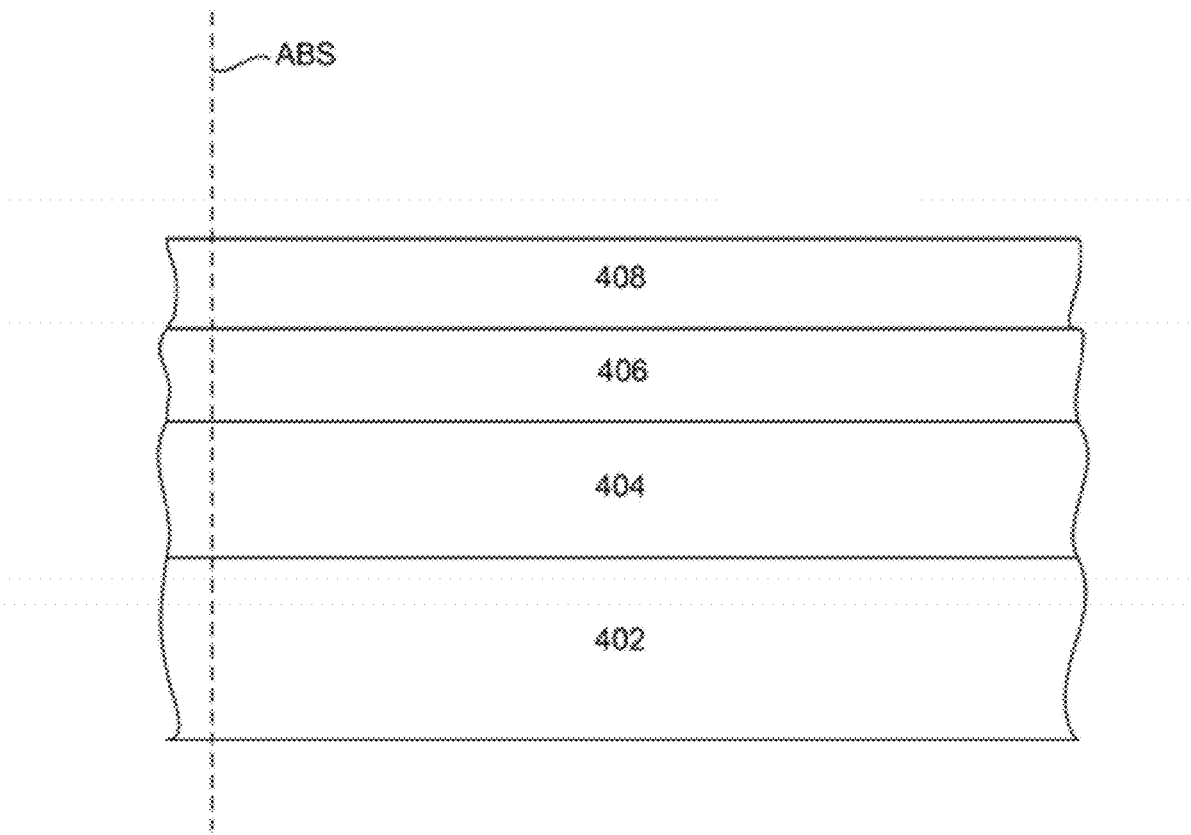
Figure 5:
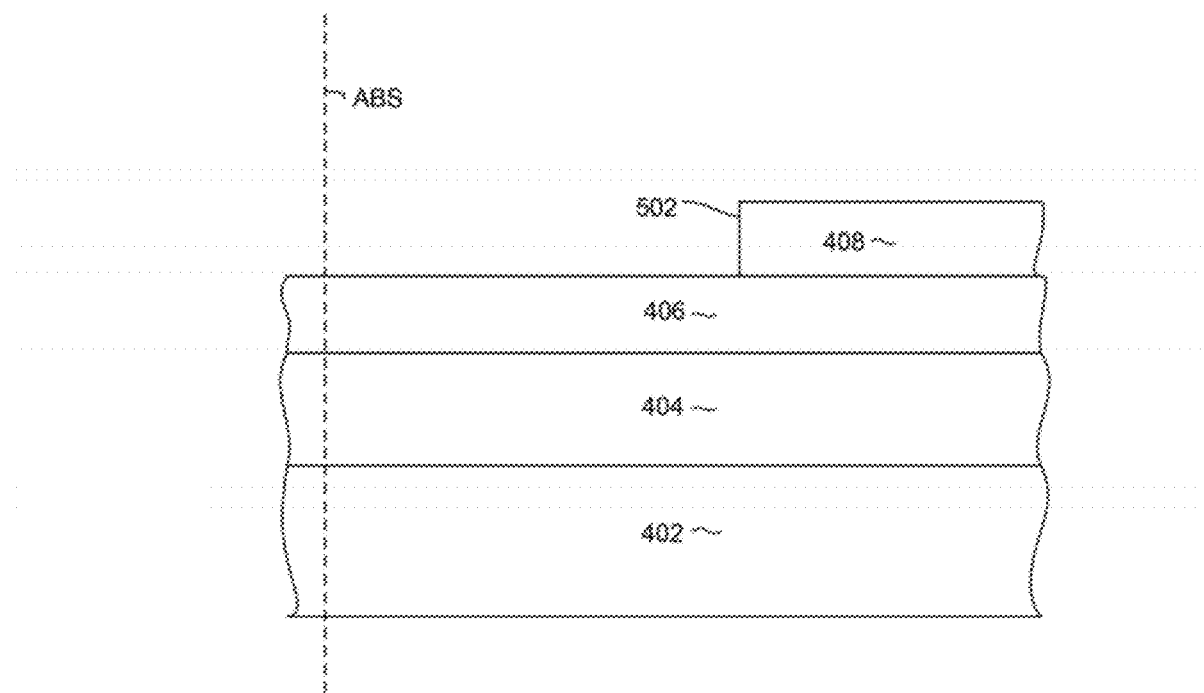
FIGS. 5-16 show a portion of a write head in various intermediate stages of manufacture illustrating a method for manufacturing a write head according to an embodiment of the invention.

With reference now to FIGS. 4-16, a method is described for constructing a write head having such a taped stepped write pole 314. With particular reference to FIG. 4, a substrate 402 is provided, and a magnetic write pole material is deposited over the substrate. The substrate can include all or a portion of the shaping layer 320 and the insulation layer 326 described above with reference to FIG. 3. The magnetic write pole material 404 can be a lamination of magnetic layers separated by thin non-magnetic layers (not shown). An end point detection layer may also be provided at the top of the write pole material 404 (also not shown). A magnetic material such as CoFe is then deposited over the magnetic write pole material 404. The magnetic material layer 406 is deposited to a thickness that is chosen to define the height of the magnetic step 343 described above with reference to FIG. 3. The magnetic layer 406 can, therefore, be 50-100 nm thick. A layer of photoresist 408 is then deposited over the magnetic material 406. Then, with reference to FIG. 5, the photoresist layer is photolithographically patterned and developed to define a mask 408 having a front edge 502 that is located to define the location of a tapered step.

Figure 6:
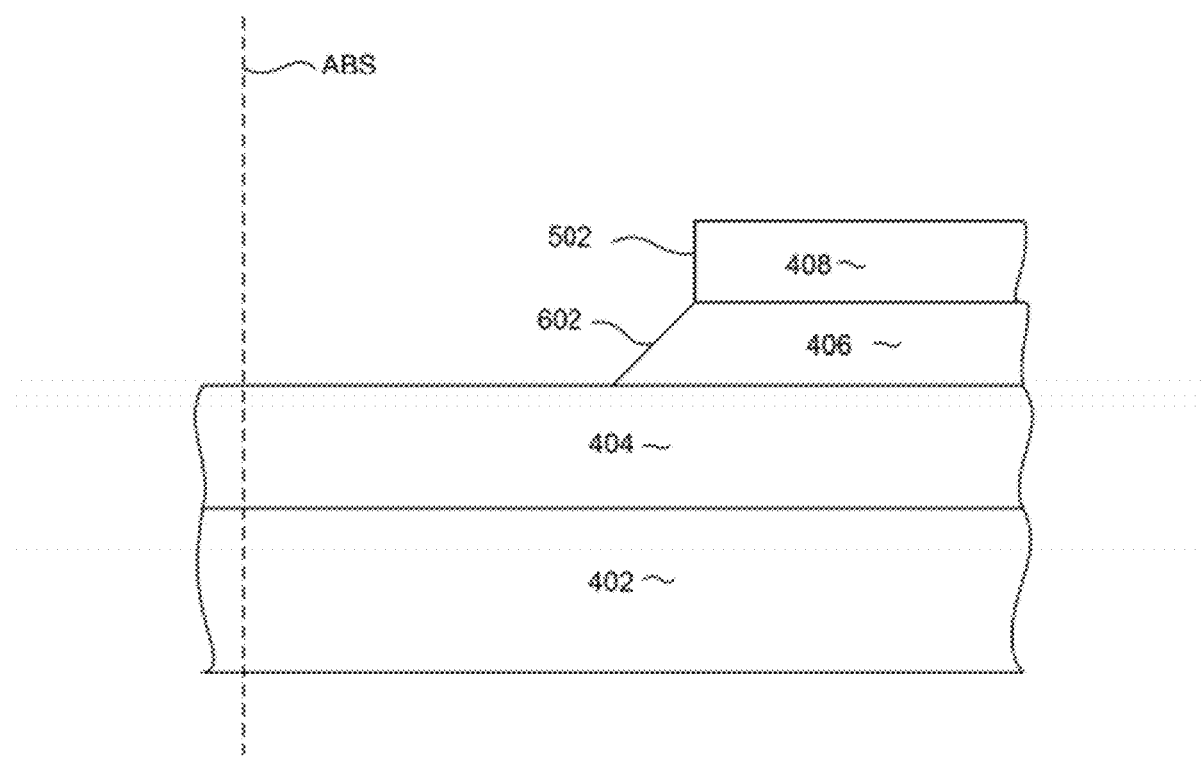

Then, with reference to FIG. 6, an ion beam etching process is performed to remove magnetic material 406 that is not protected by the mask 408. The ion beam etching is performed such that shadowing from the mask 408 causes the magnetic material to form a tapered edge 602. The resist mask 408 can then be lifted off, leaving the tapered magnetic step 406 formed over the write pole 404.

Figure 7:
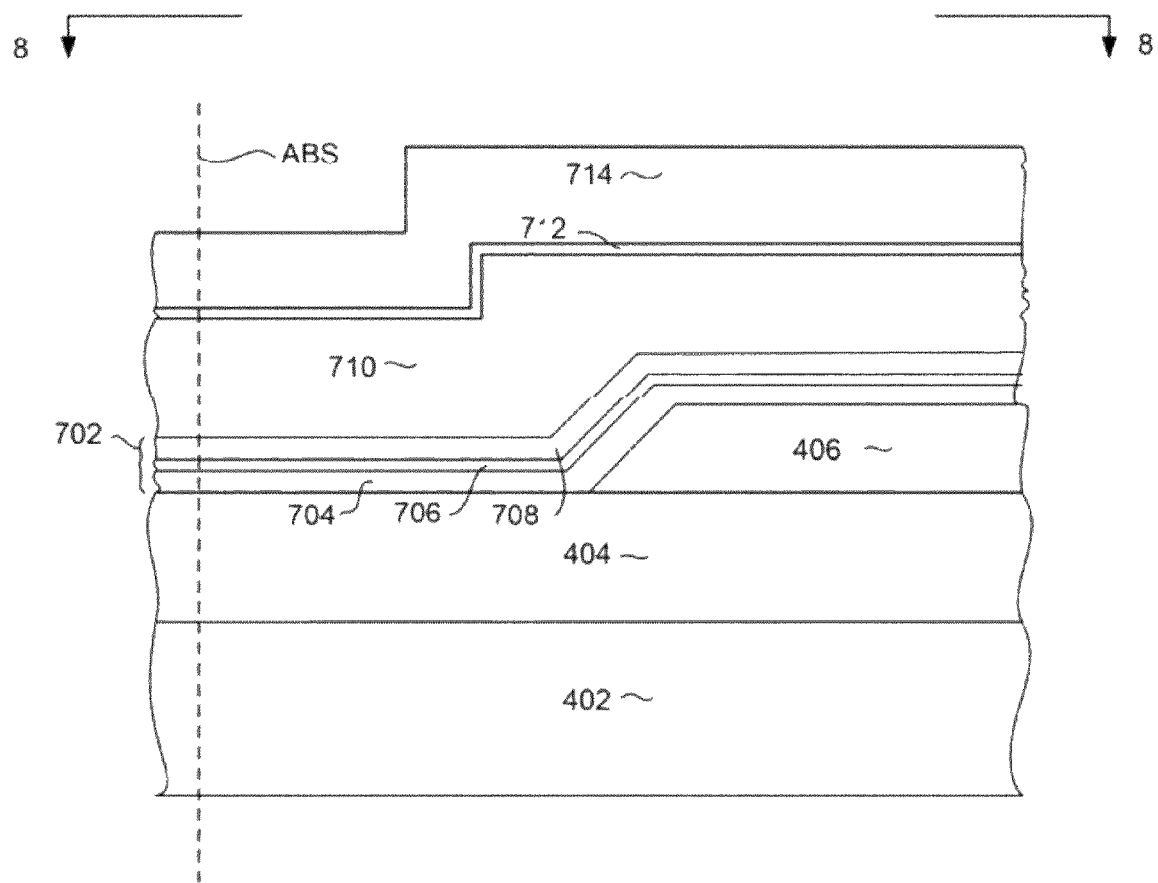
Figure 8:
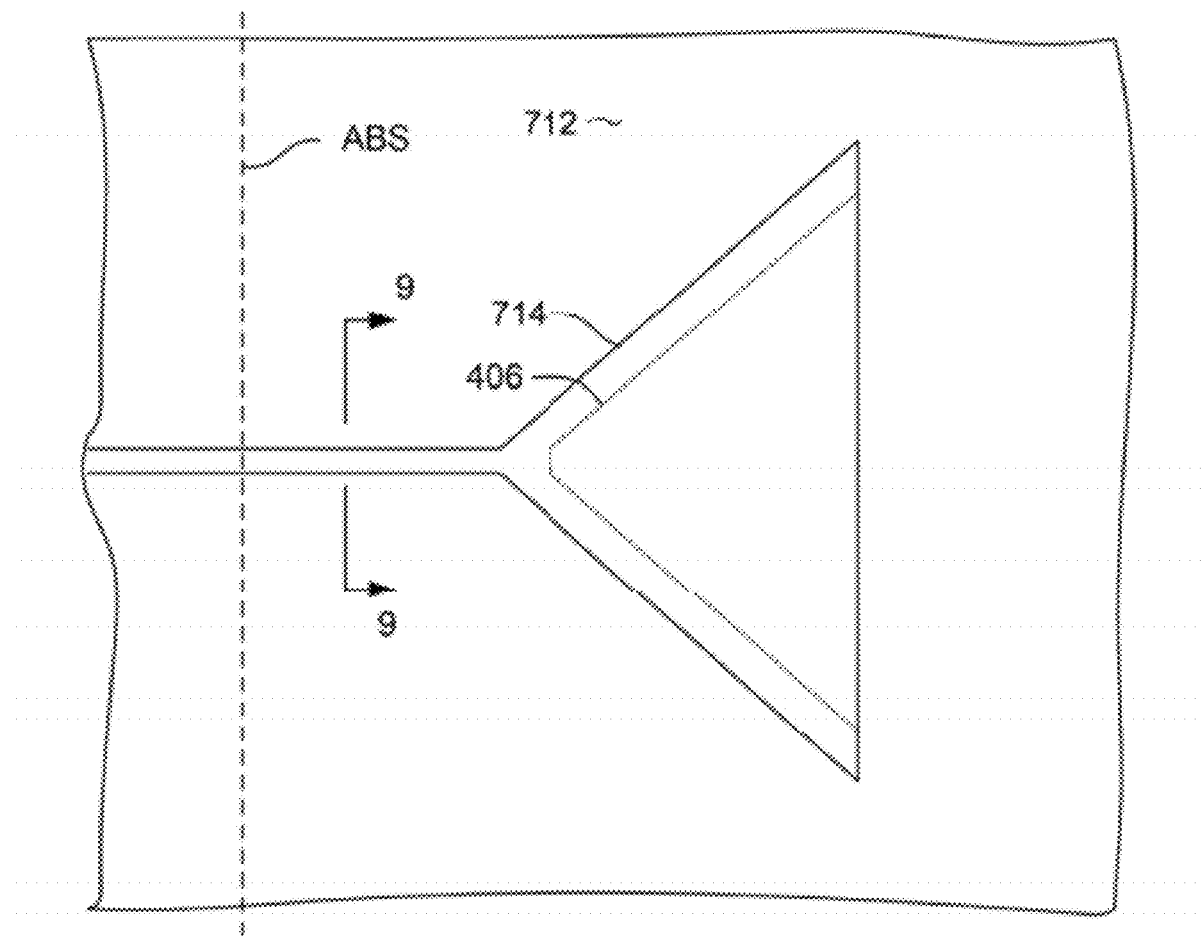
Figure 9:
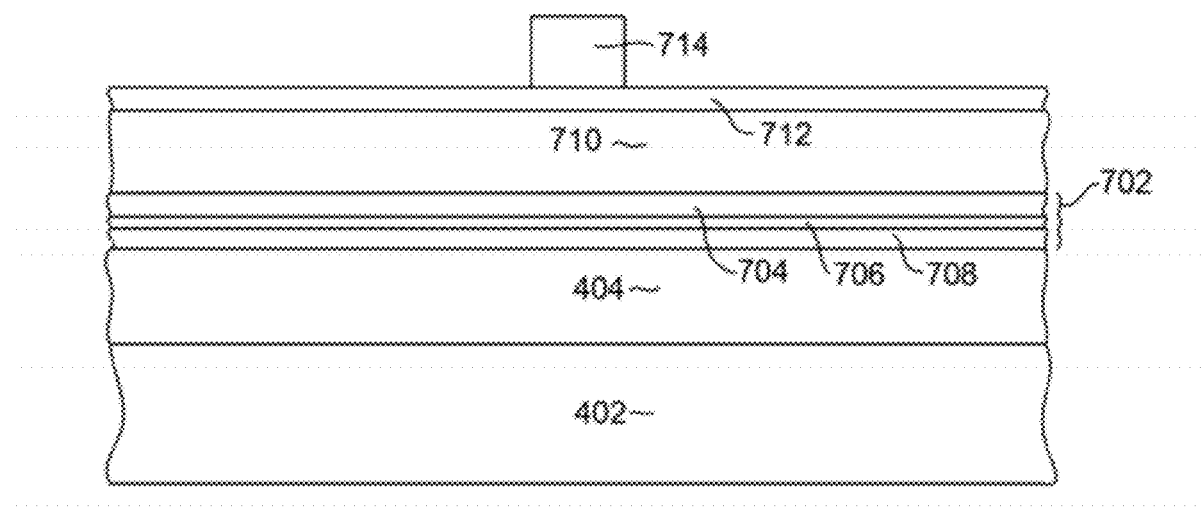

Then, with reference to FIG. 7, after forming the magnetic step structure 406, a write pole defining mask structure is formed over the write pole 404 and magnetic step 406. The write pole defining mask structure includes a RIEable hard mask 702 formed directly over the write pole material 404 and magnetic step 406. The RIEable hard mask 702 includes a first layer of RIEable material (preferably diamond like carbon) 704, an end point detection layer 706, and a second layer of RIEable material 708 (also preferably diamond like carbon). The layers 704, 706, 708 are arranged such that the end point detection layer 706 is sandwiched between the two RIEable hard mask layers 704, 708. The first and second layers 704, 708 can have a thickness of 10-30 nm, and the end point detection layer 706 can have a thickness of 2-10 nm. The end point detection layer is constructed of a material that can be readily detected by an end point detection method such as Secondary Ion Mass Spectrometry (SIMS). More specifically the end point detection layer 706 can be Ta or $TaO_x$.

An image transfer layer 710 is deposited over the laminated hard mask 702. The image transfer layer 710 can be a soluble polyimide material such as DURAMIDE®. A second hard mask structure 712, which can be a material such as $SiO_2$ is deposited over the image transfer layer and a photoresist mask 714 can be deposited over the second hard mask.

Figure 10:
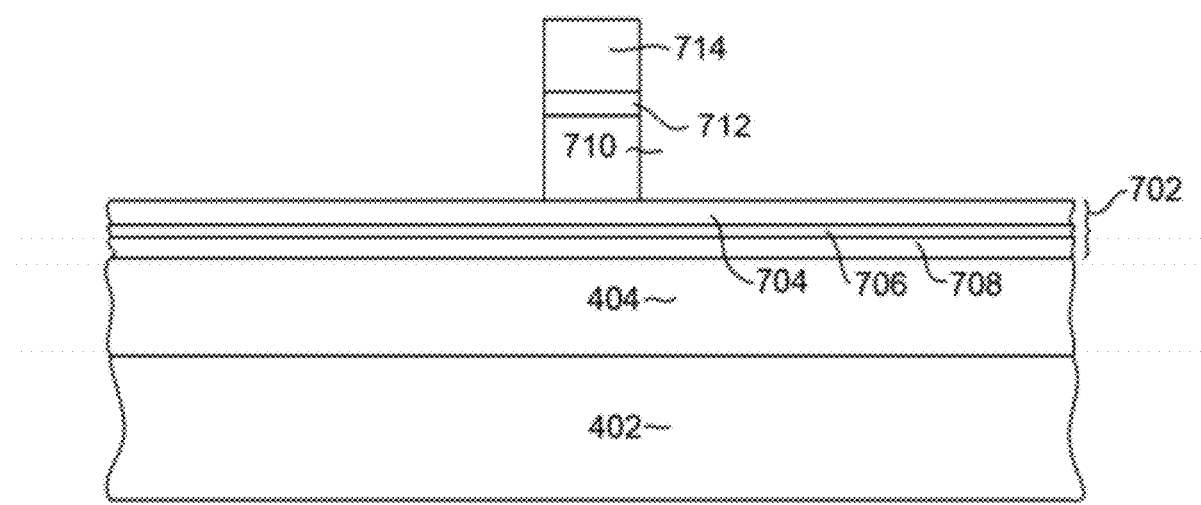

The photoresist layer is then photolithographically patterned and developed to form a desired write pole shape. This can be seen more clearly with reference to FIG. 8 which shows a top down view as taken from line 8-8 of FIG. 7. This can also be seen in FIG. 9, which shows a cross sectional view, taken from line 9-9 of FIG. 8, viewing a plane that is parallel with the air bearing surface in the pole tip region. The image of the photoresist mask 714 can then be transferred onto the underlying hard mask 712, 710, by performing a process such as reactive ion etching to remove portions of the layers 710, 712 that are not protected by the photoresist mask 714, resulting in a structure as shown in FIG. 10.

Figure 11:
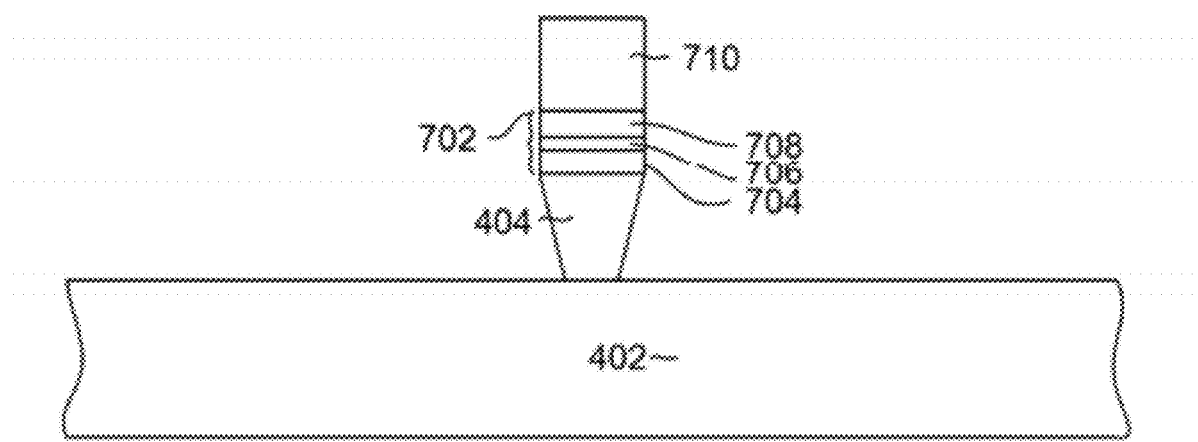

Then, an ion milling is performed to remove portions of the hard mask 702 and magnetic write pole material 404 that are not protected by the above mask layers 710, 712, 714. The photoresist mask 714 and second hard mask 712 and a portion of the image transfer layer 710 will be consumed by the is ion milling process, leaving a structure such as that shown in FIG. 11. The ion milling can be a sweeping ion milling, performed at one or more angles relative to normal to form tapered sides on the write pole as shown in FIG. 11.

Figure 12:
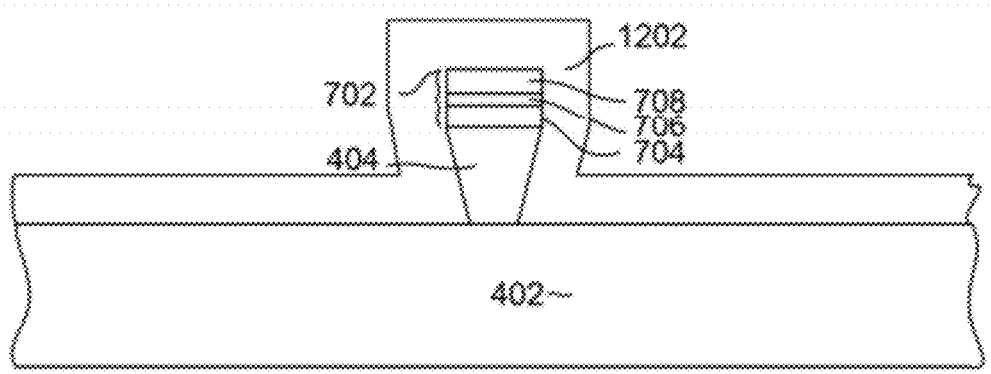

Then, with reference to FIG. 12 a layer of alumina is deposited by a conformal deposition process, preferably atomic layer deposition, to form a layer of non-magnetic side gap material 1202 over the layers 402, 404, 702. A second ion milling is then performed to preferentially remove horizontally disposed portions of the alumina layer 1202. The ion milling is terminated when the end point detection layer 706 is detected. This layer 706 can be detected by a Secondary Ion Mass Spectrometry process. This leaves a structure as shown in FIG. 12 with non-magnetic side walls 1202 formed at either side of the write pole 404.

Figure 13:
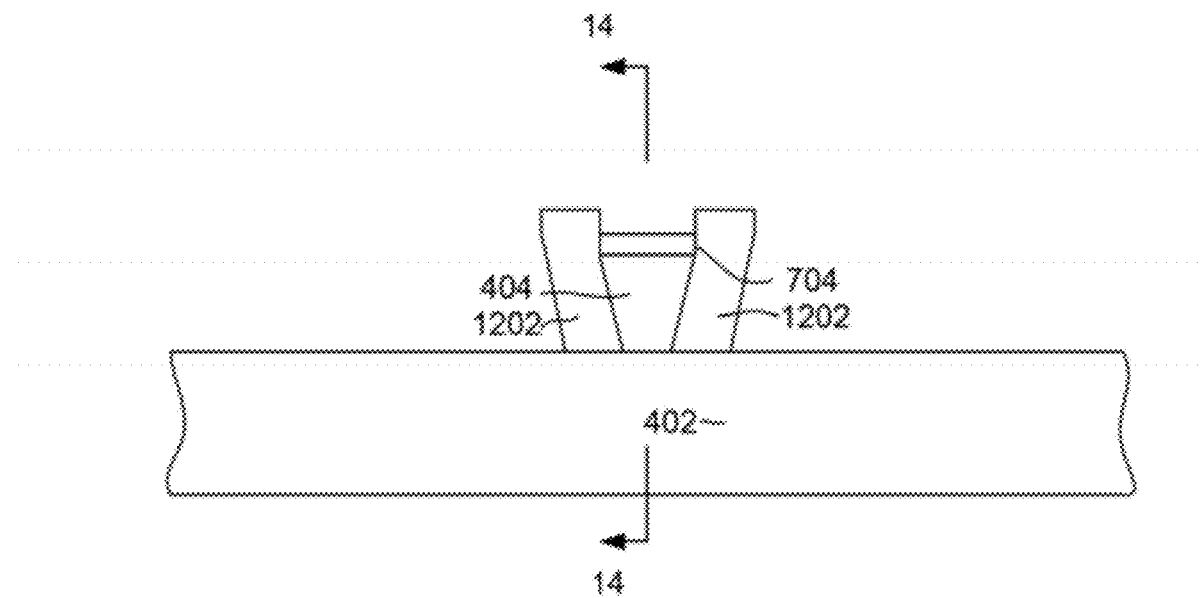
Figure 14:
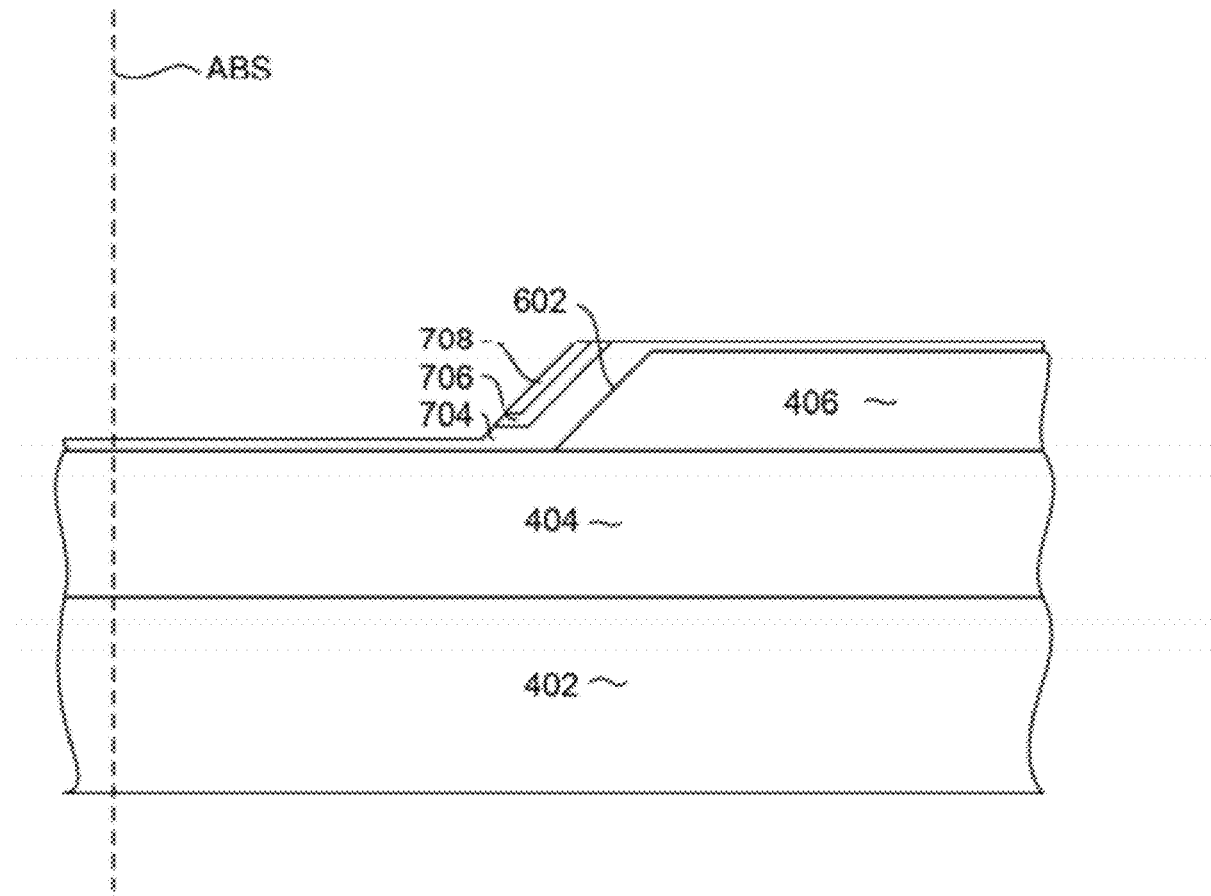

As can be seen in FIG. 13, only the bottom layer 704 of the hard mask structure remains at the top of the write pole 704. However, as can be seen in the cross sectional view of FIG. 14 (which shows a cross sectional view taken from line 14-14 of FIG. 13 viewing a plane perpendicular to the air bearing surface) the topography created by the magnetic step structure 406 causes a significant, unwanted amount of the hard mask structure 704, 706, 708 to remain at the front edge 602 of the magnetic step 406. As can be seen, the remaining mask hard mask at the front edge 602 is much thicker than over the horizontal portions of layers 404, 406 and includes the end point detection layer 706 and second hard mask layer 708.

Figure 15:
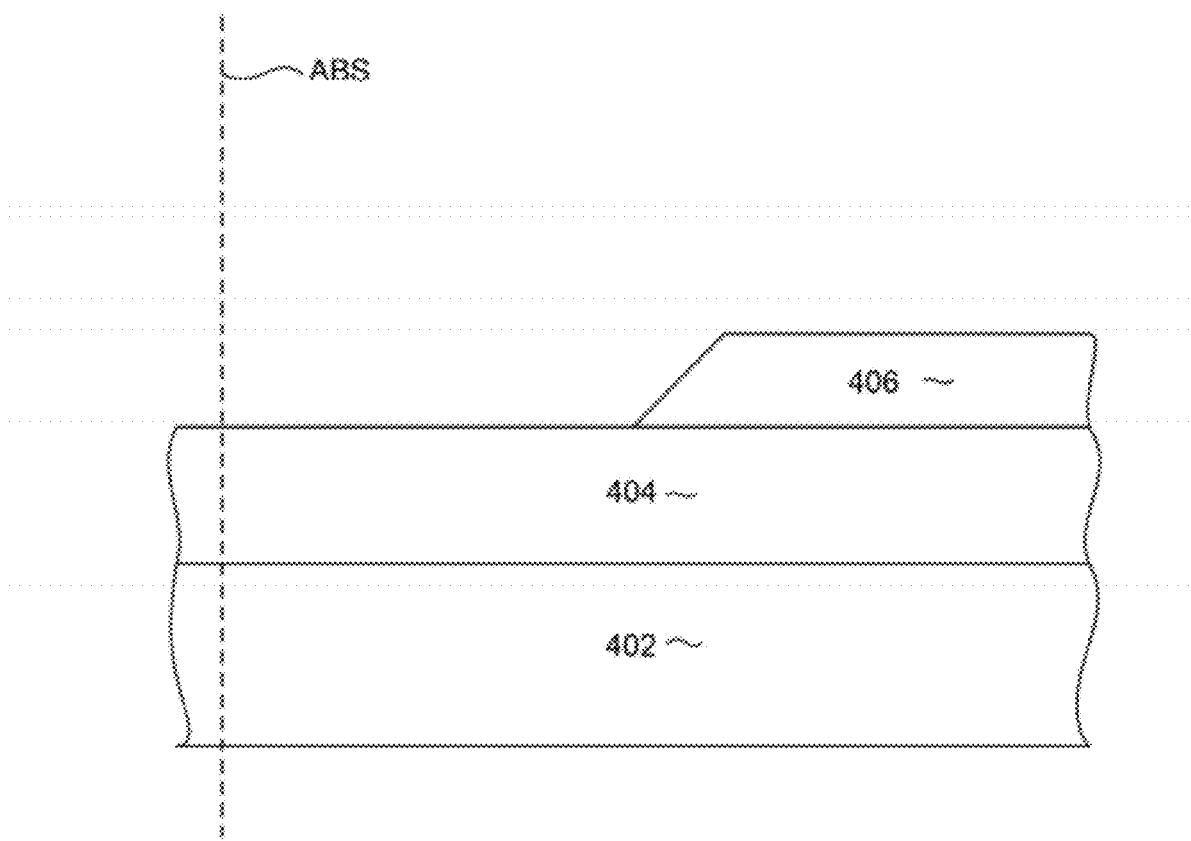

However, because the hard mask layers 704, 708 are advantageously constructed of a RIEable material, a reactive ion etching can be performed to remove the layers 704, 706, 708. The reactive ion etching is a three step reactive ion etching. First a RIE is performed using an $O_2$ or $CO_2$ based chemistry. This removes the layer 708. Then, a second RIE is performed using a Fluorine based chemistry. This removes the end point detection layer. Then a third RIE is performed, again using an $O_2$ or $CO_2$ based chemistry. This results in a structure as shown in FIG. 15, wherein all of the hard mask has been removed. The three step RIE process advantageously does not damage the write pole material 404 or magnetic step structure 406.

Figure 16:
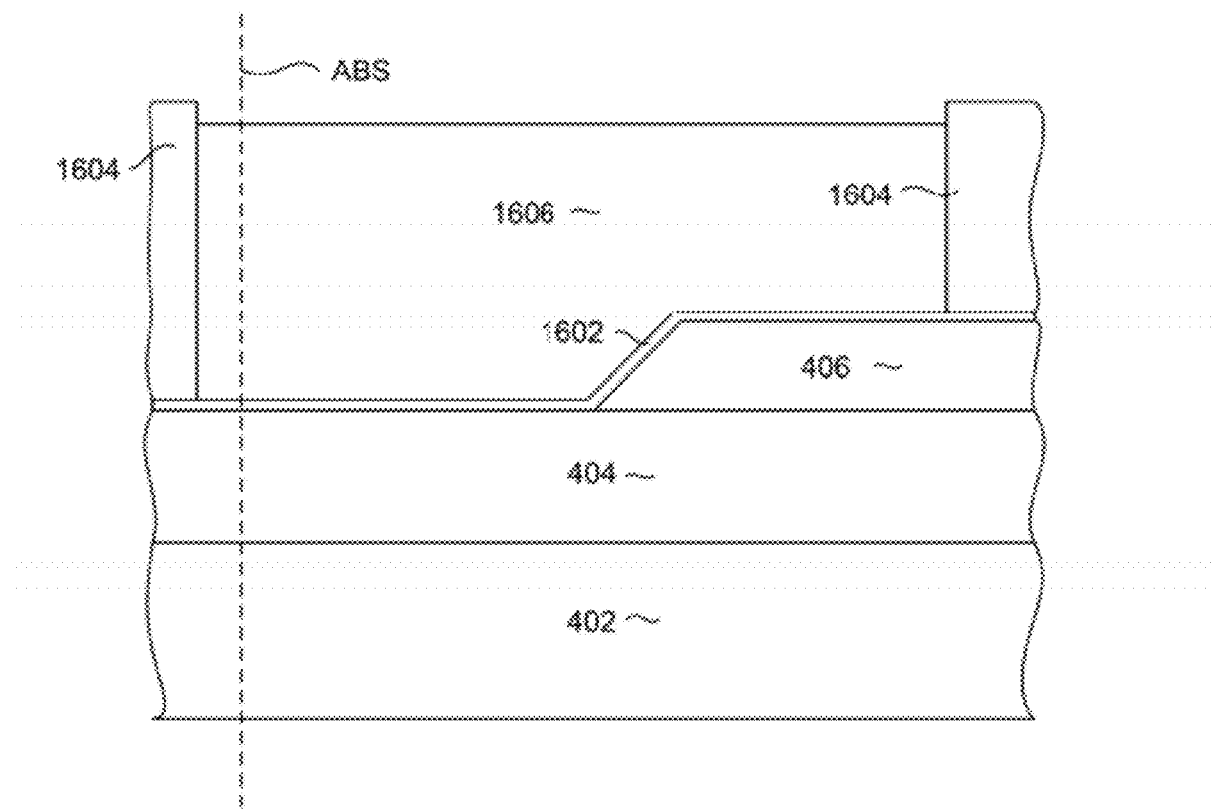

Then, with reference to FIG. 16, a non-magnetic, electrically conductive gap layer 1602 is deposited. This layer can be, for example Rh, and is deposited to a thickness that will define a trailing magnetic gap. Then, an electroplating frame mask 1604 is formed having an opening that defines a shape of a trailing, wrap-around magnetic material, and a magnetic material is electroplated into the opening in the mask 1604 to form a trailing, wrap-around magnetic shield.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   depositing a magnetic write pole material over the substrate;
   forming a magnetic step structure on the magnetic write pole material, the step structure having an edge;
   forming a write pole defining mask structure over the write pole material and the magnetic step structure, the write pole defining mask structure including a RIEable, multilayer hard mask formed directly over the write pole material and the magnetic step structure;
   performing an ion milling to remove portions of the write pole material that are not protected by the write pole defining mask structure, thereby defining a write pole;
   conformally depositing an alumina layer over the write pole, remaining write pole defining mask structure and magnetic step structure;
   performing a second ion milling to preferentially remove horizontally disposed portions of the alumina layer to form non-magnetic side gap layers at first and second sides of the write pole; and
   performing a reactive ion etching process to remove any remaining hard mask.

2. A method as in claim 1 wherein the RIEable, multilayer hard mask structure includes a first layer of diamond like carbon, an end point detection layer and a second layer of diamond like carbon, the end point detection layer being sandwiched between the first and second layer of diamond like carbon.

3. A method as in claim 2 wherein the end point detection layer comprises Ta or $TaO_x$.

4. A method as in claim 2 wherein the second ion milling is terminated when the end point detection layer is reached.

5. A method as in claim 2 wherein the wherein the second ion milling is terminated when the end point detection layer has been reached, resulting in a portion of the end point detection layer and second layer of diamond like carbon remaining on the edge of the magnetic step structure, and wherein the reactive ion etching to remove the remaining hard mask comprising a first ion milling performed in an $O_2$ or $CO_2$ chemistry, a second reactive ion etching performed in a fluorine based chemistry, and a third reactive ion etching performed in an $O_2$ or $CO_2$ chemistry.

6. A method as in claim 5 wherein the end point detection layer comprises Ta of $TaO_x$.

7. A method as in claim 5, wherein the first and second layers of diamond like carbon each have a thickness of 10-30 nm, and wherein the end point detection layer has a thickness of 2-10 nm.

8. A method as in claim 5, wherein the first and second layers of diamond like carbon each have a thickness of 10-30 nm, and wherein the end point detection layer comprises Ta or $TaO_x$ having a thickness of 2-10 nm.

9. A method as in claim 1 further comprising, after performing the reactive ion etching process to remove any remaining hard mask, depositing a non-magnetic gap material.

10. A method as in claim 1 further comprising, after performing the reactive ion etching process to remove any remaining hard mask:
    depositing a non-magnetic gap material;
    forming a shield defining mask structure having an opening configured to define a trailing, wrap-around magnetic shield; and
    electroplating a magnetic material into the opening in the shield defining mask structure.

11. A method as in claim 1 wherein the forming a magnetic step structure is performed before the formation of the write pole defining mask structure.

12. A method as in claim 1 wherein the forming a magnetic step structure further comprises forming the edge as a slanted edge.

13. A method for manufacturing a magnetic write head, comprising:
    providing a substrate;
    depositing a magnetic write pole material over the substrate;
    depositing a magnetic step layer over the substrate;
    forming a first mask structure over the magnetic step layer, the mask structure having an edge that is configured to define a magnetic step edge location;
    performing a first reactive ion etching to form a slanted edge on the magnetic step layer;
    removing the first mask structure;
    forming a second mask structure configured to define a write pole shape, the second mask structure including a multilayer hard mask that includes first and second layers of diamond like carbon and an end point detection layer sandwiched between the first and second layers of diamond like carbon, the multilayer hard mask structure being formed directly on top of the write pole material and magnetic step structure;
    performing a first ion milling to transfer the image of the second mask structure onto the magnetic write pole material, thereby defining a write pole having first and second laterally opposed sides;
    depositing a layer of alumina by atomic layer deposition;
    performing a second ion milling, the second ion milling being performed sufficiently to remove horizontally disposed portions of the second diamond like carbon layer, the second ion milling being terminated when the end point detection layer has been reached, the second ion milling leaving a portion of the end point detection layer and second diamond like carbon layer remaining on the edge of the magnetic step structure; and
    performing a multistep reactive ion etching process to remove remaining portions of the multilayer hard mask structure.

14. A method as in claim 13, wherein the end point detection layer comprises Ta or TaOx.

15. A method as in claim 13 wherein the multistep reactive ion etching process comprises a first reactive ion etching performed in an $O_2$ or $CO_2$ chemistry, a second reactive ion etching performed after the first reactive ion etching and performed in a fluorine chemistry, and a third reactive ion etching performed after the second reactive ion etching and performed in an $O_2$ or $CO_2$ chemistry.

16. A method as in claim 15 wherein the end point detection layer comprises Ta or $TaO_x$.

17. A method as in claim 13, wherein the second mask structure further comprises an image transfer layer formed over the multilayer hard mask structure, a second hard mask formed over the image transfer layer, and a photoresist layer formed over the second hard mask.

18. A method as in claim 13, wherein each of the first and second diamond like carbon layers has a thickness of 10-30 nm and the end point detection layer has a thickness of 2-10 nm.

19. A method as in claim 13, wherein each of the first and second diamond like carbon layers has a thickness of 10-30 nm and the end point detection layer comprises Ta or $TaO_x$ and has a thickness of 2-10 nm.

20. A method as in claim 13 further comprising, after performing the multistage reactive ion etching process:
   depositing a non-magnetic, electrically conductive gap layer;
   forming a third mask structure having an opening configured to define a trailing, wrap-around magnetic shield; and
   electroplating a magnetic material into the opening in the second mask structure.

* * * * *